Patented July 5, 1927.

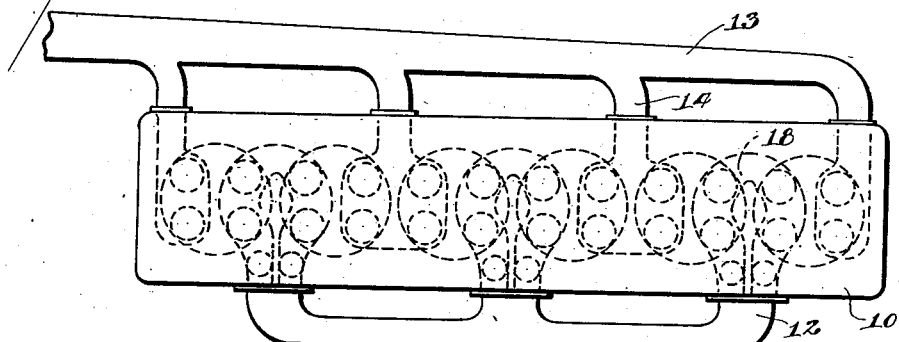
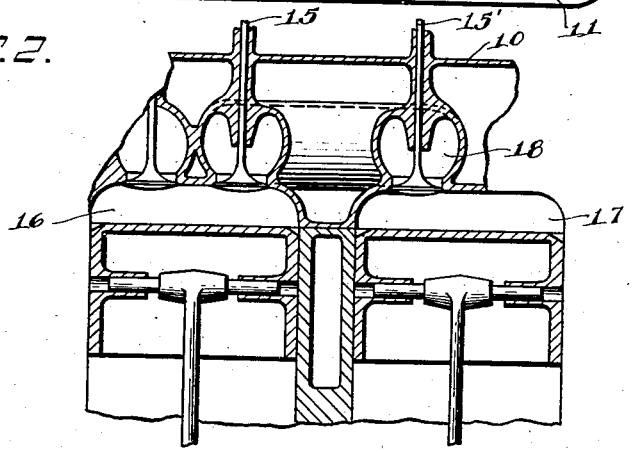
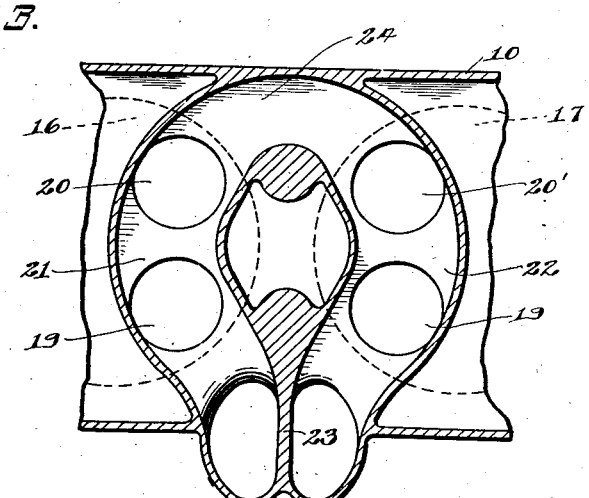

1,634,971

UNITED STATES PATENT OFFICE.

GLENN D. ANGLE, OF DETROIT, MICHIGAN, AND HAROLD E. MOREHOUSE, OF DAYTON, OHIO.

VALVE-PORT ARRANGEMENT FOR INTERNAL-COMBUSTION ENGINES.

Application filed October 31, 1924. Serial No. 747,009.

This invention relates to a valve port arrangement for internal combustion engines.

The principal object is to provide an arrangement for the intake ports of an engine employing two or more intake valves per cylinder, whereby each of the valves is fed a substantially equal volume of charge from the intake manifold, without incurring any slackening in the travel of the charge into the cylinders.

The invention is illustrated in the accompanying drawing, in which.

Fig. 1 is a plan view of an engine showing in dotted lines the nesting of the intake valves in a valve port arrangement according to the present invention.

Fig. 2 is an enlarged fragmentary sectional detail through the head of two adjacent cylinders, utilizing the valve port arrangement of Fig. 1.

Fig. 3 is a horizontal cross section through a portion of the cylinder head showing the valve port arrangement for two adjacent cylinders. This view is on a slightly more enlarged scale than Fig. 2.

In internal combustion engines utilizing ordinarily two intake valves and two exhaust valves, considerable difficulty in the matter of evenly distributing the charge to the separate valves is encountered. Where a common port is used for both valves, the first valve in the line of gas flow has a tendency to draw in a greater charge than the second valve, and where the port is increased in cross sectional area sufficiently to insure the charge reaching the second valve, there is a resulting drop in speed of the charge near the valve. Certain designs made with a view to eliminate the difficulty mentioned, utilize a separate passage to each valve, but in this construction considerable space is taken up by the second gas passage, and in some cases necessitates an increase in the overall dimensions of the engine. In the present invention, we accomplish our purpose by locating the intake valves in the usual nesting arrangement, and provide a loop passage by virtue of which the passage for one cylinder serves to conduct the charge to the more remote valve of the other cylinder, when the intake valves in the first mentioned cylinder are closed. The reverse action occurs when the valves in the last mentioned cylinder are closed, and the valves in the first mentioned cylinder open. The more remote valves are thus fed their charge in either case from two directions and so receive approximately the same charge as the first valves, which receive their charge directly from the intake manifold through a single passage.

Referring to the drawing, the cylinder head 10 of the six cylinder engine illustrated, has an intake manifold 11 with three branches 12, each leading to the intake valves of a pair of cylinders. The exhaust manifold 13 in a similar manner has branches 14 leading from the exhaust valves of the cylinders. Both the exhaust valves and the intake valves are nested according to the well accepted practice in the case of engines of the type herein illustrated, using two or more intake valves and two or more exhaust valves per cylinder. The intake valves 15 and 15' for a pair of adjacent cylinders 16 and 17, control openings for the two cylinders into a common loop inlet passage 18, fed from one of the branches 12 of the intake manifold 11. The valves 15 control openings 19 and 20 for the cylinder 16 and the valves 15' control similar intake openings 19' and 20' for the cylinder 17. The branch 12 forms a common inlet passage for the two cylinders, the cylinder being fed through separate passages 21 and 22 having the partition wall 23 therebetween. The wall 23 extends from the intake manifold inwardly past and between the valve openings 19 and 19' to the remote intake openings 20 and 20', leaving a connecting passage 24 between the passages 21 and 22 to complete the loop previously referred to.

In operation, when the valves 15' for the openings 19' and 20' are closed, the opening 20 receives its charge partly through the passage 21 and partly through the passage 22 and passage 24, all from the intake manifold. The opening 19 which is nearest the intake manifold receives its charge directly through the passage 21. The charge fed to the two openings is thus substantially the same, and since the passage is of substantially the same cross sectional area throughout, there can be no slackening in speed of the gas flow, which objection it has previously been noted, is present in practically all other valve port designs, made with a view to securing an even distribution of charge to two or more intake valves, through the use of other arrangements or structural features. It is obvious that a similar operation will result when the intake valves 15 are closed in the openings 19 and 20, as in that case the passage 21 serves as a feeder for the more remote opening 20' in the passage 22 in order to even the charge fed to the openings 19' and 20'.

We claim:

1. In an engine, the combination of a plurality of nested intake valves for a pair of adjacent cylinders, a common inlet passage therefor, two separate passages leading from the common passage to the valves of the two cylinders, and a connecting passage between said separate passages adjacent the valves most remote from the common inlet passage.

2. In an engine, a plurality of intake valves for a cylinder nested with a plurality of intake valves for an adjacent cylinder, a common inlet passage and a partition separating the valves of the one cylinder from those of the other, said partition extending from the common passage inwardly past and between the valves nearest the passage, to the most remote valves, but leaving communication between the two sides of the partition at the most remote valves.

3. In an engine, a plurality of intake valves for a cylinder, a common combustion mixture inlet passage therefor, a pair of separate passages leading from said inlet passage, one leading to the valve on the side closest the inlet passage, the other leading to the valve on the side most remote from the inlet passage said separated passages rejoining so that the first named passage leads to the valve most remote and the last named passage to the other valve.

4. In an engine, a plurality of cylinders, a plurality of intake valves for each of said cylinders, the valves of adjacent cylinders being nested, an inlet passage for each nest of valves, separate passages leading from each inlet passage to the valves of adjacent cylinders, and a passage interconnecting said separated passages at the most remote valves for the purposes described.

5. In an engine, the combination of an intake manifold having an opening for each pair of cylinders, and a looped passage leading from said opening and having the intake valves therein for the two cylinders said passages being designed to provide uniform paths to each valve substantially as shown.

6. In an engine containing a plurality of pairs of power cylinders, a main intake manifold, passages leading from said manifold for each cylinder, each passage joining with the next adjacent passage to form a continuous circuit therewith.

In testimony whereof we affix our signatures.

GLENN D. ANGLE.
HAROLD E. MOREHOUSE.